United States Patent
Insanic et al.

(10) Patent No.: US 10,458,536 B2
(45) Date of Patent: Oct. 29, 2019

(54) GEARSHIFT ASSEMBLY FOR A TRANSMISSION OF A VEHICLE

(71) Applicant: Kongsberg Automotive AB, Mullsjö (SE)

(72) Inventors: Jasmin Insanic, Jönköping (SE); Bengt Hermansson, Mullsjö (SE); Andreas Persson, Jönköping (SE)

(73) Assignee: Kongsberg Automotive AB, Mullsjö (SE)

( * ) Notice: Subject to any disclaimer, the term of this patent is extended or adjusted under 35 U.S.C. 154(b) by 44 days.

(21) Appl. No.: 15/879,736

(22) Filed: Jan. 25, 2018

(65) Prior Publication Data
US 2018/0149262 A1    May 31, 2018

Related U.S. Application Data

(63) Continuation of application No. PCT/EP2015/072025, filed on Sep. 24, 2015.

(51) Int. Cl.
| | |
|---|---|
| *F16H 59/10* | (2006.01) |
| *F16H 59/02* | (2006.01) |
| *F16H 61/22* | (2006.01) |

(52) U.S. Cl.
CPC ......... *F16H 59/10* (2013.01); *F16H 59/0204* (2013.01); *F16H 61/22* (2013.01); *F16H 2059/0295* (2013.01); *F16H 2061/223* (2013.01)

(58) Field of Classification Search
CPC ................... F16H 2059/0295; F16H 2061/223
See application file for complete search history.

(56) References Cited

U.S. PATENT DOCUMENTS

| | | | | |
|---|---|---|---|---|
| 5,016,738 A | * | 5/1991 | Shirahama | F16H 59/10 180/271 |
| 5,029,680 A | * | 7/1991 | Kobayashi | F16H 59/10 192/220.5 |

(Continued)

FOREIGN PATENT DOCUMENTS

| | | |
|---|---|---|
| DE | 10 2013 224493 A1 | 6/2015 |
| DE | 10 2013 224494 A1 | 6/2015 |

OTHER PUBLICATIONS

International Search Report for International Application No. PCT/EP2015/072025 completed May 12, 2016, and dated May 23, 2016; 3 pages.

(Continued)

*Primary Examiner* — William Kelleher
*Assistant Examiner* — Gregory T Prather
(74) *Attorney, Agent, or Firm* — Howard & Howard Attorneys PLLC

(57) ABSTRACT

A gearshift assembly for a transmission includes a shift lever which is mounted for pivotal movement in a select direction between a shifting gate for automatic mode and a shifting gate for manual mode. The gearshift assembly also includes a return mechanism including a push member, an electric motor mechanically acting on the shift lever through the push member, a driven member connected to the push member, a spring acting between the push member and the driven member, and a blocking element which can be actuated to move out of a blocking position in which the blocking element blocks the movement of the shift lever from the shifting gate for automatic mode to the shifting gate for manual mode. The return mechanism also includes a wheel drivable for rotation by the electric motor.

20 Claims, 4 Drawing Sheets

(56) References Cited

U.S. PATENT DOCUMENTS

| | | | | | |
|---|---|---|---|---|---|
| 5,063,817 | A | * | 11/1991 | Bogert | F16H 61/16 |
| | | | | | 477/115 |
| 5,311,962 | A | * | 5/1994 | Nakano | B60N 2/22 |
| | | | | | 180/271 |
| 5,829,309 | A | * | 11/1998 | Wagner | F16H 59/10 |
| | | | | | 74/473.22 |
| 5,862,899 | A | * | 1/1999 | Dahlstrom | F16H 61/22 |
| | | | | | 192/220.4 |
| 6,311,577 | B1 | * | 11/2001 | Worner | F16H 59/10 |
| | | | | | 74/471 XY |
| 6,443,026 | B1 | * | 9/2002 | Arakawa | B60K 20/06 |
| | | | | | 192/220.2 |
| 8,316,734 | B2 | * | 11/2012 | Giefer | F16H 59/0204 |
| | | | | | 74/473.12 |
| 2002/0147067 | A1 | * | 10/2002 | Yamauchi | F16H 59/105 |
| | | | | | 475/254 |
| 2004/0168537 | A1 | * | 9/2004 | Koontz | F16H 59/0204 |
| | | | | | 74/473.18 |
| 2014/0352476 | A1 | * | 12/2014 | Kim | F16H 59/02 |
| | | | | | 74/473.21 |
| 2015/0362067 | A1 | * | 12/2015 | Mitteer | F16H 61/22 |
| | | | | | 74/490.07 |
| 2018/0172140 | A1 | * | 6/2018 | Liubakka | B60K 20/02 |

OTHER PUBLICATIONS

Machine-assisted English language translation of German Publication No. DE 10 2013 224493 A1 extracted from www.espacenet.com on Apr. 25, 2018; 13 pages.

Machine-assisted English language translation of German Publication No. DE 10 2013 224494 A1 extracted from www.espacenet.com on Apr. 25, 2018; 14 pages.

* cited by examiner

GEARSHIFT ASSEMBLY FOR A TRANSMISSION OF A VEHICLE

CROSS-REFERENCE TO RELATED APPLICATIONS

This application is a continuation of international Patent Application No. PCT/EP2015/072025, filed Sep. 24, 2015, the content of which is incorporated herein by reference.

The present invention relates to a gearshift assembly for a transmission of a vehicle including a shift lever which is mounted in a base for pivotal movement in select direction between a shifting gate for automatic mode and a shift gate for manual mode and for pivotal movement in shift direction, perpendicular to the select direction in each of the shifting gates, a return mechanism operated by an electric motor (2) and arranged to mechanically act on the shift lever via a push member for returning the shift lever from the manual shifting gate to the automatic shifting gate, wherein the push member is connected to a driven member driven by the electric motor by a connection which allows movement of the push member relative to the driven member in the direction of force transmission to the shift lever and which comprises a spring acting between push member and driven member, which spring is loaded in case the return mechanism is activated to return the shift lever and an external counter-force is acting on the shift lever preventing the return movement in which case the force of the electric motor is converted to preload the spring, and a blocking element which can be actuated to move out of a blocking position in which it blocks movement of the shift lever from the automatic to the manual shifting gate.

Such a gearshift assembly for a transmission of a vehicle is disclosed in U.S. Pat. No. 8,316,734 B2. The return mechanism for driving the shift lever from the manual shifting gate back to the automatic shifting gate comprises an electric motor for driving a worm or spindle. The worm meshes with a spindle nut which can be displaced in either direction along the worm by rotating the worm in either direction. The spindle nut is coupled to a first lever which can pivot about a central axis, wherein the spindle nut is coupled to the end of the first lever remote from the pivot axis. A second lever is coupled to the first lever, wherein the connection is a pivot coupling and wherein a spring is disposed in the pivot coupling. The spring biases the second lever to a rest position in which the second lever forms an extension of the first lever extending away from the central pivot axis. The second lever is disposed such that it can act on the shift lever when second lever is pivoted together with the first lever about the central axis to thereby return the shift lever from the manual to the automatic shifting gate.

The pivotal connection of the first and second lever with a bias spring has the following advantage. In case an obstacle, such as a handbag, is blocking the way of the shift lever back to the automatic shifting gate the automatic return mechanism can run nevertheless, without danger of damages in the electric motor. In case of an obstacle the first lever is pivoted by advancing the spindle nut on the rotating worm. In this case the pivotal movement of the first lever cannot be transmitted the second lever since this is likewise blocked as the shift lever on which it is acting. The pivotal movement of the first lever relative to the second lever causes a preload to be build up in the spring. After the obstacle has been removed the bias force of the preloaded spring completes the return movement of the shift lever to the automatic gate.

A disadvantage of this gearshift assembly is that after the return mechanism has performed the return operation, the electric motor has to be operated in reverse direction (compared to the rotation for performing the return operation) to move the spindle nut and the first and second levers back as soon as the way to the manual shifting gate is to be opened again.

It is an object of the present invention to provide a gearshift assembly with a return mechanism to the automatic shifting gate which may be operated by an electric motor in a simple and reliable manner.

This object is achieved by a gearshift assembly comprising the features of claim 1. Preferred embodiments of the invention are set out in the dependent claims.

According to the present invention the return mechanism comprises a wheel drivable for rotation by the motor. The wheel is provided with a helical cam surface on a front face of the wheel. The helical cam surface is coaxial with the axis of rotation of the wheel and increases in height over the front face in circumferential direction from a starting point with minimal height and returns back to the minimal height at the starting point after one turn. The helical cam surface can be formed by the upper surface of a circumferentially extending coaxial wall on the front surface of the wheel. The circumferential wall is shaped with an increasing height over the front surface starting from a minimal height at a starting point in circumferential direction and returning to the minimal height after one turn or 360° in circumferential direction. The height can continuously increase from the starting point to reach a maximal height when approaching 360° around the circumference and the rapidly drop with a steeply falling edge to reach minimal height at the starting point.

The driven member is formed by a plunger which is disposed slidable in axial direction along the axis of rotation of the wheel, but is rotationally fixed so that it cannot rotate when the wheel is rotated. The plunger has a projection radially extending from it to extend over the helical cam surface such that the projection slides along the helical cam surface when the wheel rotates to move the plunger in axial direction towards the shift lever for pushing the push member. In this manner the plunger is moved forward when the projection is riding on the helical cam surface to increasing height over the front surface of the wheel. The push member is carried by the plunger and slidable in axial direction with respect to the plunger. The spring is a compression spring acting between the plunger and the push member. When an obstacle is blocking the way of the shift lever back to the automatic shifting gate the return mechanism is operated as usual. The plunger is displaced as usual towards the shift lever by riding with its projection on the helical cam surface of the rotating wheel. However, the push member cannot follow the displacement of the plunger since it is abutting against the blocked shift lever. Instead the compression spring between the plunger and the push member is compressed. Therefore, the energy of the electric motor for the return operation is absorbed in the compression spring and stored therein. After the obstacle has been removed, the force of the preloaded spring is acting on the push member and thereby on the shift lever and completes the return movement of the shift lever to the automatic shifting gate.

It will be appreciated that the return mechanism can perform the return operation by turning the wheel such that the projection of the plunger rides on the helical cam surface from a minimal height over the front surface of the wheel to a position along the helical cam surface with maximal height. After the projection of the plunger passed by the maximal height region of the helical cam surface the wheel is rotated further by the electric motor in the same direction to a position in which the projection of the plunger is located again above the cam surface in a region with minimal height over the front surface of the wheel. In this state the driver can pivot the shift lever back to the manual gate which is also pushing back the push member and the plunger such that the projection of the plunger comes closer to the front surface of the wheel, and the projection of the plunger comes close to or into abutment against the helical cam surface in a region of minimal height over the front surface of the wheel. Thus, the electric motor of the return mechanism has to be operated to rotate in the same direction in order to perform the return operation and to get back to a state in which the push member can be return by the shift lever when the latter is pivoted again to the manual gate. Therefore, the operation of the electric motor which is operated to rotate in one direction only is simplified.

The helical cam surface can have a shape such that it increases in height over the front surface of the wheel from a starting point and reaches a maximal height over the front surface of the wheel when approaching 360° in circumferential direction of the wheel, and then drop to the minimal height again when reaching 360°. However, the helical cam surface can also have other shapes, for example increasing from the minimal height at a starting point and reaching a maximal height at 180° around the circumference, whereafter the height is decreasing again and reaching the minimal height at 360° around the circumference. In this case the electric motor has to perform a rotation of almost 180° to perform a return operation, and has to perform a further rotation to 360° when the gear shift assembly is brought to the state again in which it is possible to pivot the shift lever to the manual gear. In principle, the shape of the helical cam surface could also be different in the sense that its periodicity is not 360°, but for example 180° only. Then, there would be two opposing helical cam surfaces, the first extending from 0° to 180°, and the second from 180° to 360°, wherein in each helical cam segment of 180° the height of the helical cam surfaces increases from a minimum height to a maximal height, and falls back to the minimum height again. In this case the electric motor would only have to drive the wheel to rotate by 180° in order to perform the return operation and to bring the gearshift assembly back to a state in which the shift lever can be pivoted to the manual shifting gate again. In principle, there could be even more than two such helical cam segments following each other around the circumference which will then have a circumferential extension of 120° in case of three following helical cam segments, 90° in case of four helical cam segments etc. However, a large number of subsequent helical cam segments around the circumference is not preferred since then the angular turning range of the wheel for performing the operation is getting correspondingly smaller as the circumferential extension of the helical cam segments gets smaller. Therefore, it is preferred to have a single helical cam surface with a periodicity of 360°, increasing from a minimal height to a maximal height over the front surface of the wheel and dropping back to the minimal height again in one turn of the wheel. In this case the electric motor has to drive the wheel to a full rotation around 360° in order to perform the return operation and the operation to bring the gearshift assembly back to a state in which the shift lever can be pivoted back to the manual gate. A full rotation of the wheel corresponds to more rotations of the electric motor, and thus provides for a better gear or transmission ratio for the electric motor which can then have a correspondingly lower output power.

In a preferred embodiment the electric motor of the return mechanism is arranged to drive a worm for rotation. The wheel is a worm gear and meshing with the worm. Such worm gear transmissions can be designed in a space-saving manner. In addition, such worm gear transmissions can be designed with a high gear ratio such that a small electric motor can be used to drive the worm gear for rotation.

In a preferred embodiment the wheel of the return mechanism is further provided with a radial cam surface presenting a side surface with varying radial distance to the axis of rotation of the wheel around the circumference of the wheel. The blocking element is spring biased to the blocking position in which it blocks movement of the shift lever towards the manual shifting gate. The radial cam surface is arranged to interact with the blocking element to allow the blocking element to be returned by the spring bias to the blocking position when the wheel of the return mechanism is turned to perform a return operation, i.e. to push the push member to move it onto the shift lever to return it to the automatic shifting gate. The radial cam surface is further arranged to interact with the blocking element to drive it away and keep it away from the blocking position against the spring bias when the wheel of the return mechanism is turned further to a position in which the projection of the plunger is disposed opposite to a region of a helical cam surface with minimal height. In this situation the shift lever can be brought to the manual shifting gate again by manually pivoting the shift lever which causes the push member and plunger to be pushed back. Of course, in this state the blocking member has to be moved out of the blocking position already to allow this movement. The radial cam surface is arranged such that it has brought the blocking member already out of the blocking position against the spring force when the wheel has turned the helical cam surface to such a position in which the helical cam surface allows that the shift lever is pivoted again to the manual shifting gate, i.e. to a position in which the projection of the plunger is disposed opposite to a region of minimal height of the helical cam surface so that the push member and the plunger can be pushed back until the projection comes into abutment on the helical cam surface in the region of minimal height over the front surface of the wheel.

In a preferred embodiment the blocking element is a pivotal blocking arm provided with a cam follower extending to the radial cam surface. The radial cam surface and the cam follower are arranged to cooperate such that upon rotation of the wheel the cam follower slides along the radial cam surface to selectively drive the blocking arm to pivot out of the blocking position against the bias force of the spring and to allow the blocking arm to be returned to the blocking position by the bias spring force.

In such an arrangement the return mechanism acts on both the driven element to perform the return operation, and on the blocking member to bring it out of the blocking position when this is necessary.

The invention will now be described in connection with a preferred embodiment shown in the drawings in which.

The gearshift assembly of the embodiment of the present invention shown in the Figures comprises a shift lever 1 (the lower end of which is shown in FIGS. 3, and 8 to 10). The shift lever 1 is mounted in a bearing such that it can be pivoted in a select direction between a shifting gate for automatic mode and a shift gate for manual mode. In each of the shifting gates the shift lever can be pivoted in a shift direction, perpendicular to the select direction.

Figure 1:
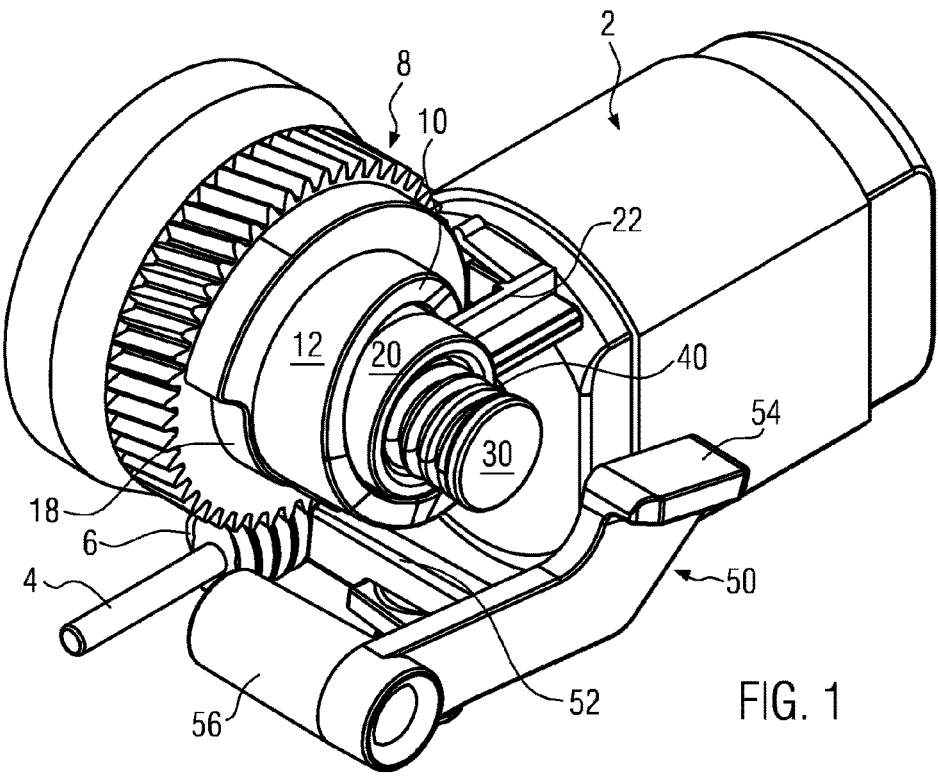
FIGS. 1 and 2 show perspective views of parts of the return mechanism of a preferred embodiment of the gearshift assembly.
Figure 2:
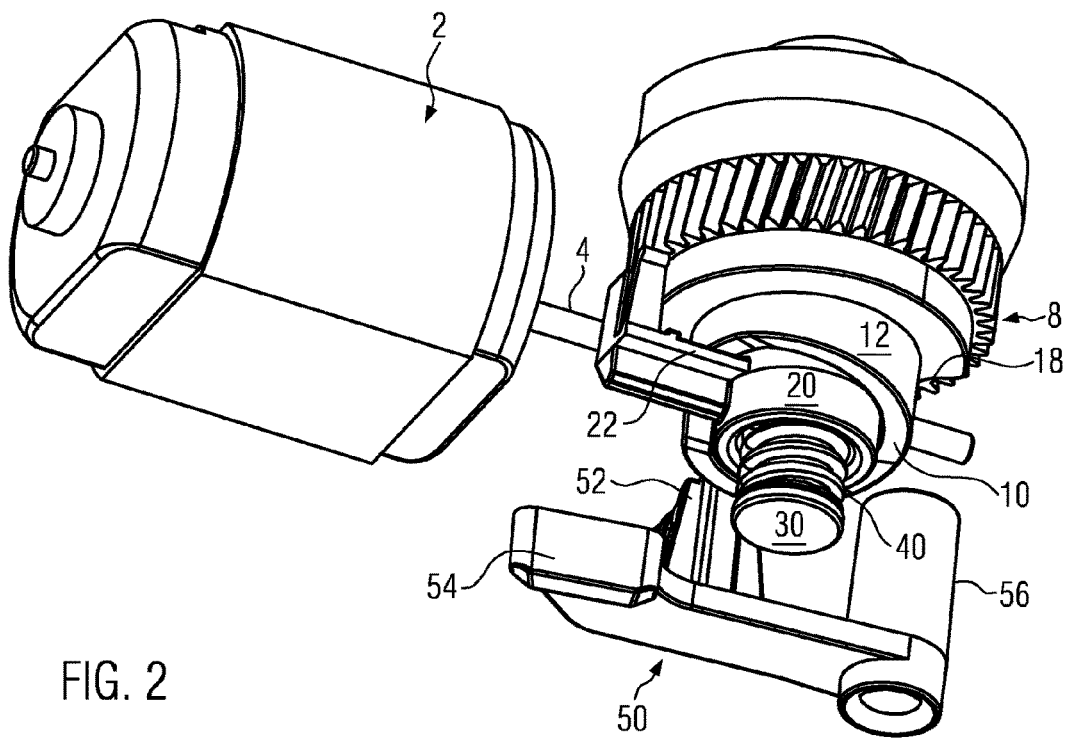
Figure 3:
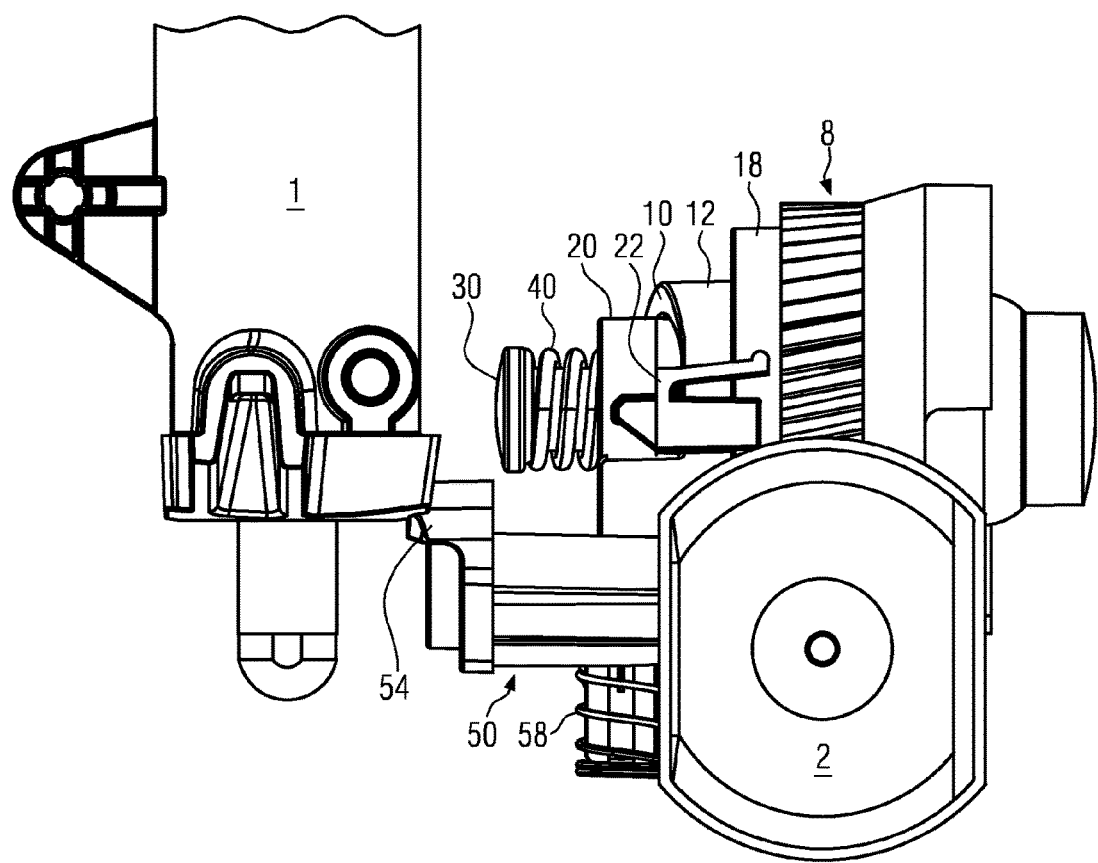
FIG. 3 shows a side view on the return mechanism of the embodiment shown in FIGS. 1 and 2.

The gearshift assembly further comprises a return mechanism allowing to mechanically drive the shift lever 1 back to the automatic shifting gate. With reference to FIGS. 1 to 3 an overview over the main components of the return mechanism will be given. The return mechanism comprises an electric motor 2 which drives a shaft 4 for rotation. The shaft 4 carries a worm 6 which is shown in FIG. 1. The worm 6 meshes with a worm gear 8. Worm 6 and worm gear 8 are preferably arranged such that a high gear ratio is achieved which allows to employ a rather small electric motor 2. In this manner the worm gear 8 can be driven to rotate by the electric motor 2.

Figures 4, 5:
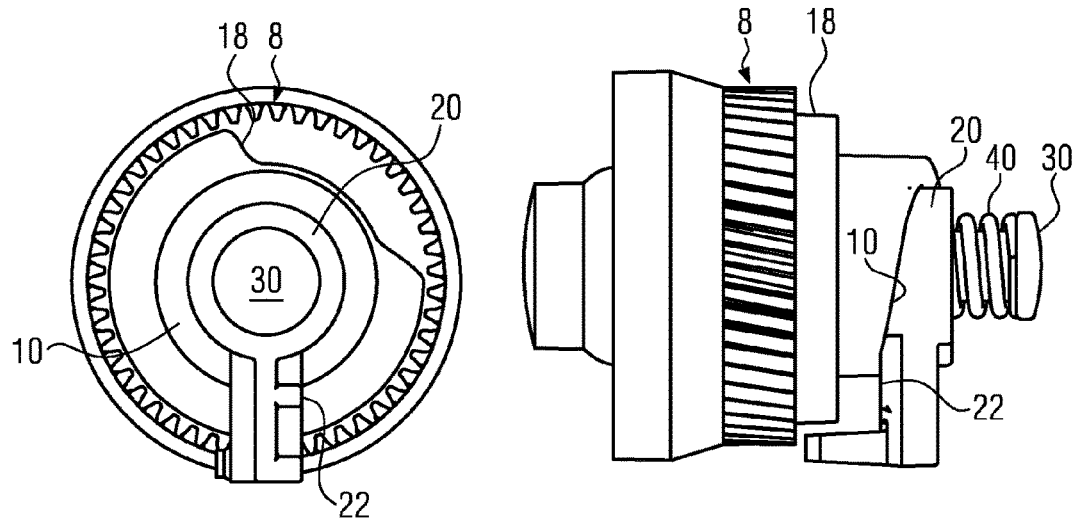
FIG. 4 shows a top plan view of parts of the return mechanism of the preferred embodiment shown in the Figures.
FIG. 5 shows a side view of part of the return mechanism of the preferred embodiment.
Figure 6:
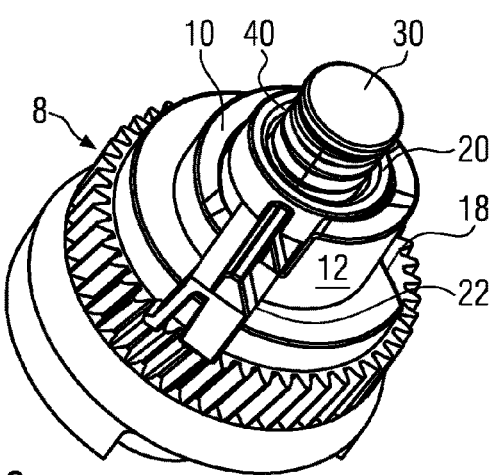
FIGS. 6 and 7 show perspective vies of the parts of the return mechanism shown in FIGS. 4 and 5.
Figure 7:
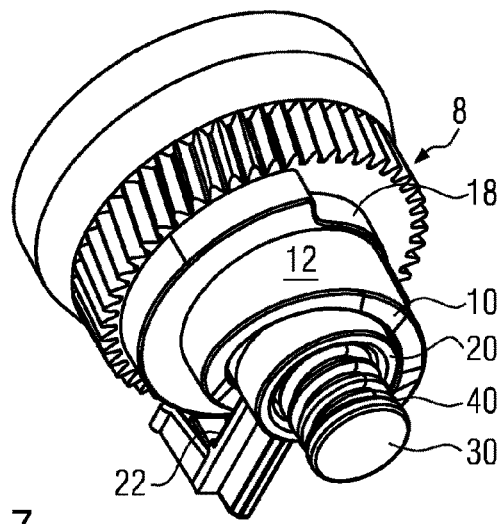

On a front surface of the worm gear 8 a radial cam surface 18 and a helical cam surface 10 are formed. The radial cam surface 18 forms a side surface next to the worm gear 8, which side surface has a varying radial distance to the rotational axis of the worm gear 8, i.e. the side surface of the radial cam surface 18 is along a certain portion of the circumference closer to the rotational axis of the worm gear 8 than in the remaining portion of the circumference, as can best be seen in FIG. 4. The function of the radial cam surface 18 will be described in more detail further below.

The helical cam surface 10 can also be seen in FIGS. 4 to 7. The helical cam surface 10 is formed by the upper surface of a circular wall 12 which is coaxially surrounding the rotational axis of the worm gear 8. The helical cam surface 10 has a minimal height over the front surface of the worm gear 8 at a starting point. From the starting point in circumferential direction the height over the front surface of the worm gear 8 increases (see for example FIGS. 5 and 7). Before reaching 360° in circumferential direction the helical cam surface 10 has reached a maximal height over the front surface and then has a falling edge to return to the minimal height when the starting point is reached again.

A hollow plunger 20 is disposed coaxially with the rotational axis of the worm gear 8, and can be displaced in the direction of the rotational axis of the worm gear 8, but is fixed against rotation around the rotational axis of the worm gear 8. The plunger 20 is partially received within the circular wall 12 which provides the helical cam surface 10 at its upper surface. The plunger 20 is furthermore provided with a radial projection 22 which can be seen in FIG. 1 and FIGS. 4 to 7. The radial projection 22 extends radially beyond the circular wall 12, as can best be seen in FIGS. 4 and 5. The surface of the radial projection 22 facing the helical cam surface 10 comes into abutment on the helical cam surface 10. If the radial projection 22 is in a position such that it is in abutment with the helical cam surface, and when the electric motor is then activated to rotate the worm gear 8 in a direction such that the height of the helical cam surface 10 over the front surface of the worm gear 8 is increasing, plunger 20 is pushed along the axis of rotation and away from the worm gear 8 while the radial projection 22 slides upwards on the rotating helical cam surface 10.

A helical compression spring 40 is with one end received within the plunger 20 and is supported therein. The opposite end of the compression spring 40 supports a push member 30 which is facing a lower end portion of the shift lever, as can be seen in FIG. 3.

When the return mechanism is started by activating the electric motor 2 worm gear 8 starts to rotate. This causes that the radial projection 22 of the plunger 20 moves relatively along the helical cam surface to increasing heights over the front surface of the worm gear 8. In this manner the plunger 12 is pushed to move in the direction of the axis of rotation of the worm gear 8 and towards the shift lever 1. When the push member 30 reaches the lower end portion of the shift lever 1, and the plunger is further moved towards the shift lever 1 by further rotation of the helical cam surface 10 towards the maximal height of the helical cam surface 10 over the front surface of the worm gear 8, the push member 30 acts on the lower end portion of the shift lever 1 to move it back to the automatic shifting gate.

Figure 8:
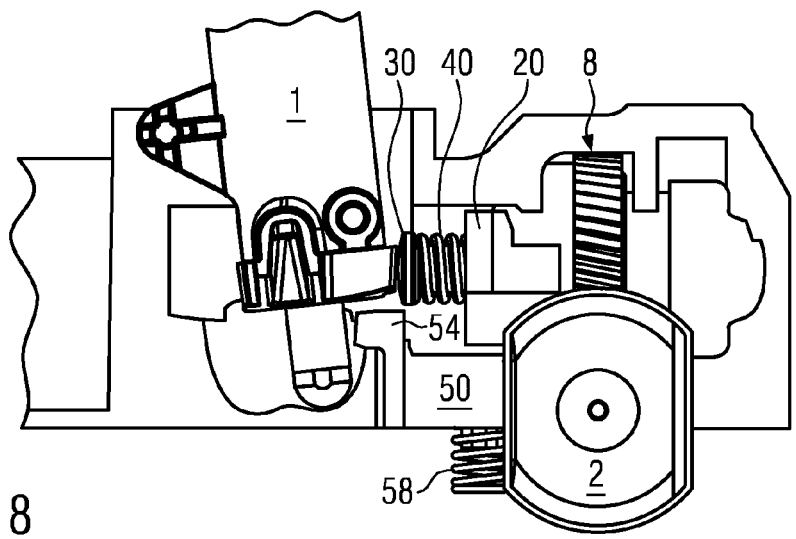
FIGS. 8 to 10 show subsequent movement states in which the return mechanism of the gearshift assembly performs a return operation.
Figure 9:
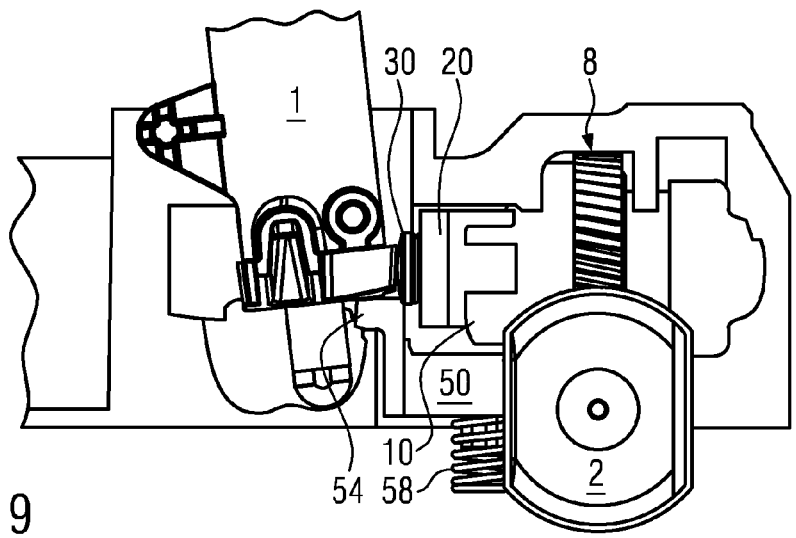
Figure 10:
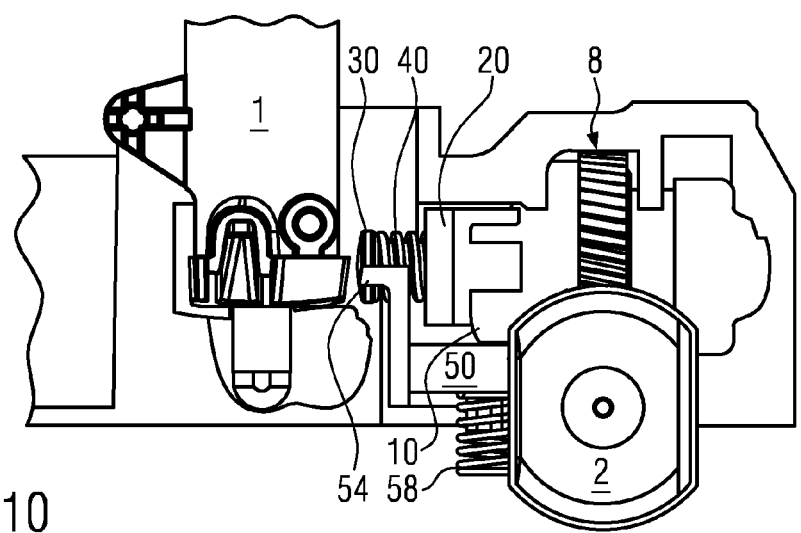

In FIGS. 8 to 10 such a return operation is shown as a sequence of moving states, wherein in the operation shown the situation is complicated by an obstacle which temporarily blocks movement of the shift lever 1 to the automatic shifting gate. In the state shown in FIG. 8 the shift lever 1 is in the manual shifting gate. The return operation has been started by activating electric motor 2, which causes rotation of the worm gear 8, which in turn causes a rotation of the helical gear surface 10 which rotates relatively to the radial projection 22 of plunger 20 such that the helical cam surface 10 which is in abutment with the radial projection 22 of the plunger 20 increase in height over the front surface of the worm gear 8. This causes plunger 20 to be pushed towards the shift lever 1, together with spring 40 and push member 30 until push member 30 comes into abutment with the surface of the shift lever 1. If in this situation the shift lever 1 is blocked by an external obstacle, for example a handbag disposed next to the shift lever, the return operation cannot yet be completed because shift lever 1 is blocked. In this case the operation of the electric motor 2 continuous as usual, worm gear 8 rotates as usual and therefore plunger 20 is pushed further towards the shift lever 1. However, since push member 30 which is in abutment against the shift lever cannot take part in this movement. The movement of the plunger 20 relative to the push member 30 is absorbed by compression spring 40 which is thereby compressed to a preloaded state. This is shown in FIG. 9 in which the plunger 20 has been moved towards the shift lever 1 compared to FIG. 8, whereas push member 30 remained in place in abutment against the blocked shift lever 1.

If the obstacle is now removed, for example when the driver leaves the car, the force of the preloaded compression spring 40 on the push member 30 is sufficient to move push member 30 such that shift lever 1 is pushed to the automatic shift gate as shown in FIG. 10. The force of the preloaded compression spring 40 is sufficient for this operation so that electric motor 2 is not active during this phase.

When the shift lever 1 has been push back to the automatic shifting gate by the return mechanism, the movement of the shift lever to the automatic shifting gate is in the last stage of movement supported by a detent mechanism which is formed by a detent extending from the lower end of the shift lever 1 which cooperates with detent valleys in each of the shifting gates (see FIGS. 8 to 10). It is sufficient that the return mechanism moves the shift lever 1 far enough such that the detent passes the crest between the valleys of the detent track, whereafter the detent force supports the final movement into the automatic shifting gate.

Upon completion of the return operation worm gear 8 has been rotated to a position in which the radial projection 22 of plunger 20 has passed the area of maximal height of the helical cam surface 10 and is disposed opposite to the starting position of the helical cam surface again, i.e. the region of minimal height of the helical cam surface above the front surface of the worm gear 8. In this position push member 30 and plunger 20 are free again to be moved back when the shift lever 1 is pivoted in select direction towards the manual shifting gate.

To control movement of the shift lever 1 towards the manual shifting gate there is further provided a manual mode blocking element 50 which is shown in FIGS. 1 to 3 and 8 to 10. The blocking element 50 is mounted such that it can pivot about pivot pin 56. At the end opposite to the pivot pin 56 the blocking element 50 comprises a blocking arm 54. A spring 58 is acting on the blocking element 50 to bias it to a rest position in which the blocking arm 54 is raised sufficiently with respect to the lower end of the shift lever 1 such that it blocks shift lever 1 against movement towards the manual mode shifting gate. This state is shown in FIGS. 3 and 10.

An arm is projecting from the blocking element 50 as a cam follower 52 (see FIGS. 1 and 2) which extends towards the front surface of the worm gear 8 to cooperate with the radial cam surface 18. The remote end of the cam follower 52 is in abutment against the radial cam surface 18. The radial cam surface 18 presents a side surface with variable radial distance to the axis of rotation of worm gear 8. In particular, the radial cam surface 18 comprises a circumferential portion of reduced radius compared to the remaining circumferential portion which forms part of a circle as can be best seen in the plan view of FIG. 4. When the remote end of blocking arm 54 is in the reduced diameter portion of the radial cam surface 18 the blocking element 50 is free to be pivoted upwards by the bias spring 58 such that the blocking arm 54 is urged towards the blocking position in abutment against a side surface of the lower end portion of the shift lever 1, as shown in FIG. 3. If the worm gear 8 is rotated such that the remote end of cam follower 52 slides out of the reduced diameter portion of the radial cam surface 18, cam follower 52 urges blocking element 50 to be pivoted such that the blocking arm 54 is moved downwards and out of the way of the lower end of the shift lever 1. This state is shown in FIG. 8 in which the shift lever 1 has been pivoted to the manual shifting gate.

In the state of FIG. 9 the return mechanism has already been operated, and as a consequence the cam follower 52 has already reached the reduced diameter portion of the radial cam surface 18. In this situation the bias spring 58 already urges the blocking arm 54 upwards, but its movement is still blocked by the lower surface of shift lever 1. As soon as the preloaded spring 40 of the return mechanism was able to push shift lever 1 back to the automatic shifting gate, the lower surface of shift lever 1 has been moved out of the way of blocking arm 54 such that it has been moved back to the blocking position, as can be seen in FIG. 10.

The invention claimed is:

1. A gearshift assembly for a transmission of a vehicle comprising:
   a shift lever mounted in a base for pivotal movement in a select direction between a shifting gate for automatic mode and a shifting gate for manual mode and for pivotal movement in a shift direction, perpendicular to said select direction in each of the shifting gates;
   a return mechanism arranged to mechanically act on said shift lever, with said return mechanism comprising,
   a push member,
   an electric motor mechanically acting on said shift lever through said push member for returning said shift lever from said shifting gate for manual mode to said shifting gate for automatic mode,
   a driven member connected to said push member with said driven member being driven by said electric motor by a connection which allows movement of said push member relative to said driven member in a direction of force transmission to said shift lever,
   a spring acting between said push member and said driven member, which said spring is loaded in case said return mechanism is activated to return said shift lever and an external counter-force is acting on said shift lever preventing a return movement in which case a force of the electric motor is converted to preload said spring,
   a blocking element which can be actuated to move out of a blocking position in which said blocking element blocks movement of said shift lever from said shifting gate for automatic mode to said shifting gate for manual mode, and
   a wheel coupled to and drivable by said electric motor with said wheel having a helical cam surface for pushing the push member.

2. The gearshift assembly according to claim 1, wherein said electric motor of said return mechanism is arranged to drive a worm, wherein said wheel is a worm gear meshing with said worm.

3. The gearshift assembly according to claim 1, wherein said wheel of said return mechanism is further provided with a radial cam surface presenting a side surface with varying radial distance from an axis of rotation of said wheel.

4. The gearshift assembly according claim 3, wherein said blocking element comprises a pivotal blocking arm provided with a cam follower extending to said radial cam surface, wherein said radial cam surface and said cam follower are arranged to cooperate such that upon rotation of said wheel said cam follower slides along said radial cam surface to selectively drive said pivotal blocking arm to pivot out of said blocking position against a bias spring force of said spring or to allow said pivotal blocking arm to be returned to said blocking position by said bias spring force.

5. The gearshift assembly as set forth in claim 3, wherein said blocking element is biased by a spring bias of said spring to said blocking position.

6. The gearshift assembly as set forth in claim 5, wherein said radial cam surface is arranged to interact with said blocking element to allow said blocking element to be returned by said spring bias to said blocking position when said wheel of said return mechanism is turned to push said push member to move said push member onto said shift lever to return said push member to said shifting gate for said automatic mode, and to drive said push member away and keep said push member away from said blocking position against said spring bias when said wheel of said return mechanism is turned further to a position in which said projection of said plunger is disposed vis-à-vis a region of said helical cam surface with minimal height, such that said shift lever can be brought to said shifting gate for manual mode by manually pivoting said shift lever which causes said push member to be pushed back.

7. The gearshift assembly as set forth in claim 1, wherein said helical cam surface is on a front face of said wheel.

8. The gearshift assembly as set forth in claim 7, wherein said helical cam surface is coaxial with an axis of rotation of said wheel and increases in height over said front face of said wheel from a minimal height in circumferential direction from a starting point and returns back to said minimal height at said starting point after one turn.

9. The gearshift assembly as set forth in claim 8, wherein said driven member is formed by a plunger which is disposed slidable in an axial direction along said axis of rotation of said wheel.

10. The gearshift assembly as set forth in claim 9, wherein said driven member is rotationally fixed.

11. The gearshift assembly as set forth in claim 10, wherein the plunger has a projection radially extending from said plunger to extend over said helical cam surface such that said projection slides along said helical cam surface when said wheel rotates to move said plunger in axial direction towards said shift lever for pushing said push member, wherein push member is slidable in an axial direction with respect to said plunger.

12. The gearshift assembly as set forth in claim 9, wherein said spring is a compression spring acting between said plunger and said push member.

13. A return mechanism for use in a gearshift assembly for a transmission of a vehicle, with the gearshift assembly including a shift lever mounted in a base for pivotal movement in a select direction between a shifting gate for automatic mode and a shifting gate for manual mode, said return mechanism comprising:
   a push member,
   an electric motor mechanically acting on said shift lever through said push member for returning said shift lever from said shifting gate for manual mode to said shifting gate for automatic mode,
   a driven member connected to said push member with said driven member being driven by said electric motor by a connection which allows movement of said push member relative to said driven member in a direction of force transmission to said shift lever,
   a spring acting between said push member and said driven member, which said spring is loaded in case said return mechanism is activated to return said shift lever and an external counter-force is acting on said shift lever preventing a return movement in which case a force of the electric motor is converted to preload said spring,
   a blocking element which can be actuated to move out of a blocking position in which said blocking element blocks movement of said shift lever from said shifting gate for automatic mode to said shifting gate for manual mode, and
   a wheel coupled to and drivable by said electric motor with said wheel having a helical cam surface for pushing said push member.

14. The return mechanism as set forth in claim 13, wherein said electric motor of said return mechanism is arranged to drive a worm, wherein said wheel is a worm gear meshing with said worm.

15. The return mechanism as set forth in claim 13, wherein said wheel of said return mechanism is further provided with a radial cam surface presenting a side surface with varying radial distance from an axis of rotation of said wheel.

16. The return mechanism as set forth in claim 15, wherein said blocking element comprises a pivotal blocking arm provided with a cam follower extending to said radial cam surface, wherein said radial cam surface and said cam follower are arranged to cooperate such that upon rotation of said wheel said cam follower slides along said radial cam surface to selectively drive said pivotal blocking arm to pivot out of said blocking position against a bias spring force of said spring or to allow said pivotal blocking arm to be returned to said blocking position by said bias spring force.

17. The return mechanism as set forth in claim 13, wherein said helical cam surface is on a front face of said wheel.

18. The return mechanism as set forth in 17, wherein said helical cam surface is coaxial with an axis of rotation of said wheel and increases in height over said front face of said wheel from a minimal height in circumferential direction from a starting point and returns back to said minimal height at said starting point after one turn.

19. The return mechanism as set forth in claim 18, wherein said driven member is formed by a plunger which is disposed slidable in an axial direction along said axis of rotation of said wheel.

20. The return mechanism as set forth in claim 19, wherein said driven member is rotationally fixed.

* * * * *

UNITED STATES PATENT AND TRADEMARK OFFICE
CERTIFICATE OF CORRECTION

PATENT NO. : 10,458,536 B2  
APPLICATION NO. : 15/879736  
DATED : October 29, 2019  
INVENTOR(S) : Jasmin Insanic et al.

Page 1 of 1

It is certified that error appears in the above-identified patent and that said Letters Patent is hereby corrected as shown below:

In the Claims

In Column 9, Line 15 (Claim 11):
Please delete "wherein push member is" and replace with: --wherein said push member is--.

Signed and Sealed this
Eighteenth Day of February, 2020

Andrei Iancu
*Director of the United States Patent and Trademark Office*